(12) United States Patent
Pereira

(10) Patent No.: US 9,047,068 B2
(45) Date of Patent: Jun. 2, 2015

(54) INFORMATION HANDLING SYSTEM STORAGE DEVICE MANAGEMENT INFORMATION ACCESS

(75) Inventor: David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 543 days.

(21) Appl. No.: 13/285,844

(22) Filed: Oct. 31, 2011

(65) Prior Publication Data

US 2013/0110308 A1 May 2, 2013

(51) Int. Cl.
  *G06F 1/20* (2006.01)
  *G05D 23/19* (2006.01)

(52) U.S. Cl.
  CPC .............. *G06F 1/206* (2013.01); *G05D 23/19* (2013.01); *Y02B 60/1275* (2013.01)

(58) Field of Classification Search
  None
  See application file for complete search history.

(56) References Cited

U.S. PATENT DOCUMENTS

| | | | | |
|---|---|---|---|---|
| 5,978,903 | A * | 11/1999 | Quimby et al. | 712/229 |
| 6,078,990 | A * | 6/2000 | Frazier | 711/114 |
| 6,594,698 | B1 * | 7/2003 | Chow et al. | 709/226 |
| 7,694,188 | B2 | 4/2010 | Raghuraman et al. | |
| 7,792,597 | B2 * | 9/2010 | Brey et al. | 700/34 |
| 7,802,019 | B2 | 9/2010 | Shu et al. | |
| 2004/0153786 | A1 * | 8/2004 | Johnson et al. | 714/25 |
| 2007/0219747 | A1 | 9/2007 | Hughes et al. | |
| 2008/0130156 | A1 * | 6/2008 | Chu et al. | 360/71 |
| 2008/0162811 | A1 * | 7/2008 | Steinmetz et al. | 711/114 |
| 2010/0128387 | A1 | 5/2010 | Sendelbach et al. | |
| 2010/0169573 | A1 * | 7/2010 | Tsuji | 711/114 |
| 2010/0306476 | A1 * | 12/2010 | Giri et al. | 711/125 |
| 2011/0047356 | A2 * | 2/2011 | Flynn et al. | 712/220 |
| 2012/0131249 | A1 * | 5/2012 | Cepulis et al. | 710/269 |
| 2012/0210041 | A1 * | 8/2012 | Flynn et al. | 711/3 |
| 2013/0073110 | A1 * | 3/2013 | Johnson et al. | 700/299 |
| 2013/0179615 | A1 * | 7/2013 | Guddeti et al. | 710/266 |
| 2014/0059295 | A1 * | 2/2014 | Northcutt et al. | 711/114 |

* cited by examiner

*Primary Examiner* — Ryan Jarrett

(74) *Attorney, Agent, or Firm* — Terrile, Cannatti, Chambers & Holland, LLP; Robert W. Holland

(57) ABSTRACT

Management information for managing thermal conditions within an information handling system is retrieved from a storage device drive information area by request to a logical block address associated with the management information. The controller of the storage device maps the logical block address to the drive information area to respond to the request to the logical block address with the management information. For example, storage device temperature information measured with a temperature sensor of the storage device and stored to a log page or diagnostics page of the storage device maps from the drive information area to the logical block address so that a controller of the storage device responds with the log page or diagnostics page when a request is made to the logical block address.

19 Claims, 2 Drawing Sheets

INFORMATION HANDLING SYSTEM STORAGE DEVICE MANAGEMENT INFORMATION ACCESS

BACKGROUND OF THE INVENTION

1. Field of the Invention

The present invention relates in general to the field of information handling system management, and more particularly to a system and method for information handling system storage device management information access.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information through the cooperation of a number of different processing components. For example, a central processing unit (CPU) executes application instructions stored in volatile memory, such as DRAM. The application instructions are stored in non-volatile memory, such as a hard disk drive or solid state drive, which allows storage during powered down periods. A chipset with firmware instructions, such as a BIOS, transitions the processing components from a powered down state to an active state and then coordinates physical interactions between the processing components and Input/Output (I/O) devices. In some instances, a management processor monitors the operation of the processing components and provides management functions, such as remote power down and power up. For instance, server information handling systems often include a baseboard management controller that manages processing components through a management bus, such as an IPMI or I2C bus. Active management of processing components by a BMC or other system manager helps to efficiently use system resources by allocating power and cooling resources. For example, if the temperature within a server chassis becomes too great, a BMC can throttle the CPU to operate at a lower speed so that less heat is created. As another example, if the temperature within the chassis remains below thermal limits, the BMC can reduce cooling fan operation so that the information handling system runs more quietly.

In addition to active management of components through a management bus, many components include internal diagnostics systems that monitor component operations to detect and report component faults. One example of such internal diagnostics is the thermistors found in non-volatile storage devices, such as hard disk drives and solid state drives. Storage device thermistors log internal storage device temperatures and report the temperatures to a host through an internal log page or diagnostics page. Although the temperature information is provided to the host through the main storage device interface, such as a SATA interface, the command to obtain temperature information from a log page or diagnostics page are different from queued I/O commands that read and write data at the hard disk drive. In the case of SATA hard disk drives, when a command reads temperature information from a log page or diagnostics page, read and write commands must be aborted to perform the temperature data read. Occasionally aborting read and write commands does not have a significant impact on storage device I/O performance, however, frequent accesses to storage device internal log or diagnostics pages can have an impact on storage device performance. In one example embodiment, reading a temperature from a hard disk drive at five second intervals reduced I/O performance for reads and writes by as much as 40%.

SUMMARY OF THE INVENTION

Therefore a need has arisen for a system and method which provides management information from a storage device without disrupting storage device I/O operations.

In accordance with the present invention, a system and method are provided which substantially reduce the disadvantages and problems associated with previous methods and systems for obtaining management information from a storage device. Commands that seek management information from the storage device are managed as queue-able I/O commands to which the storage device responds in a similar manner as read and write commands. A logical block address associated with management information is mapped to the management information so that requests at the storage device for the logical block address will retrieve the management information.

More specifically, an information handling system processes information with components disposed in a chassis and cooled by a cooling fan. A cooling module, such as firmware running on a chipset of the information handling system, maintains a predetermined thermal environment within the chassis by controlling the cooling fan speed. The cooling module controls the thermal environment with a closed loop temperature control that includes temperatures sensed at one or more non-volatile storage devices, such as a hard disk drive or solid state drive. The cooling module retrieves the temperatures sensed at the non-volatile storage device by requesting information from logical block address of the non-volatile storage device that is associated with a drive information area of the non-volatile storage device, such as a log or diagnostics page. When a controller of the non-volatile storage device detects the drive information logical block address, the controller maps the request to the drive information area to retrieve drive information, such as a log of temperatures sensed at the storage device. The controller handles the request to the drive information logical block address like other read and write requests to logical block addresses so that temperature information is retrieved without interfering with other queued read and write requests.

The present invention provides a number of important technical advantages. One example of an important technical advantage is that commands to retrieve storage device management information from a storage device to a host information handling system are supported with read and write I/O commands so that frequent polling of management information from the storage device does not significantly impact storage device I/O performance. The ability to frequently poll temperature information from storage devices makes the temperature information available for closed loop temperature control systems to optimize cooling fan speeds within an information handling system chassis. Optimized cooling fan operation ensures proper thermal conditions for the operation of the components within a chassis while minimizing power use and acoustic noise that typically increases with increased cooling fan speeds.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system retrieves management information from a drive information area by mapping a logical block address to the drive information area and retrieving information from the drive information area when a request is made for the mapped logical block address. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
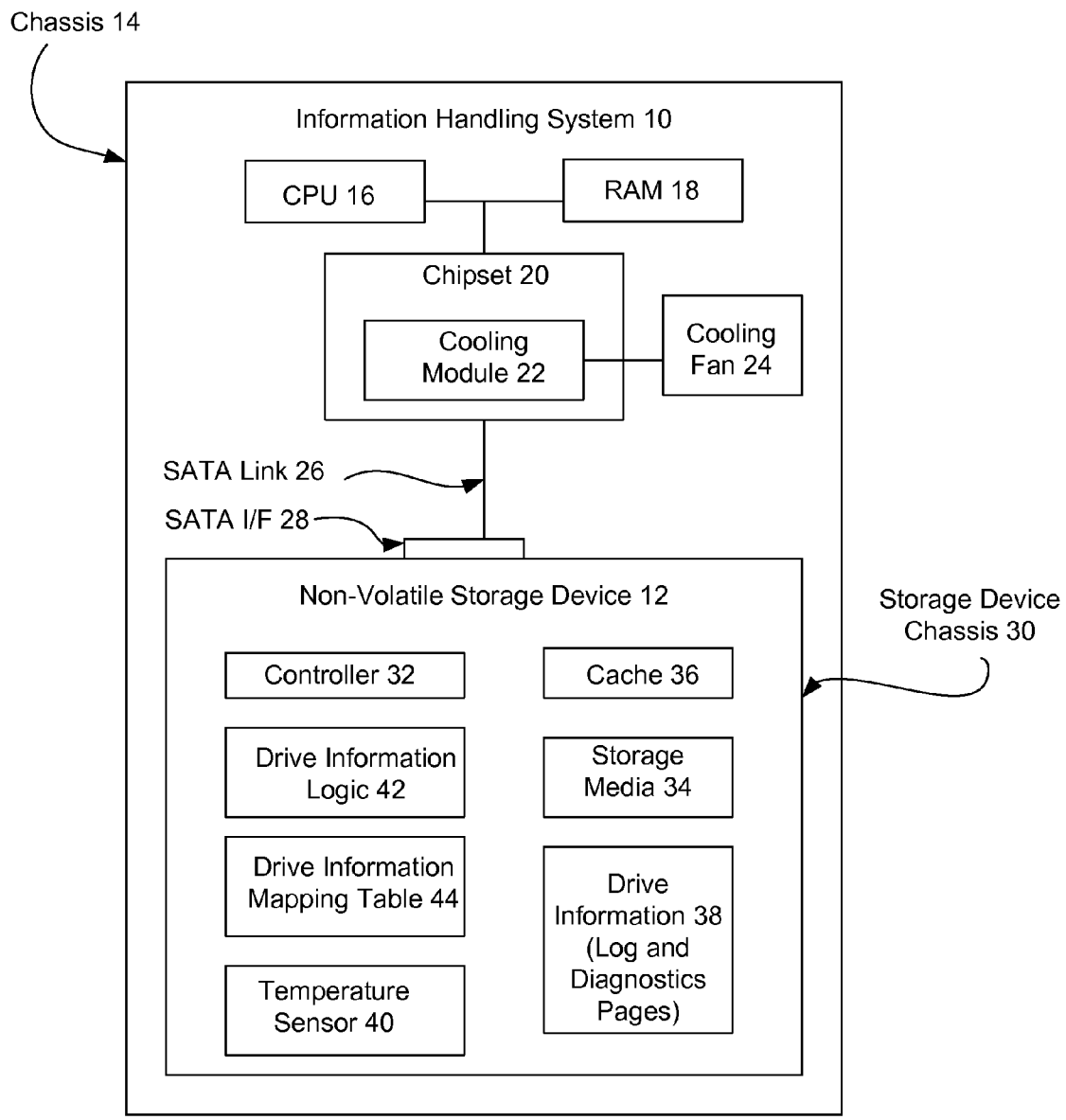
FIG. 1 depicts a block diagram of an information handling system and non-volatile storage device that communicate drive information in response to logical block address requests.

Referring now to FIG. 1, a block diagram depicts an information handling system 10 and non-volatile storage device 12 that communicate drive information in response to logical block address requests. Information handling system 10 processes information with processing components disposed in a chassis 14, such as a processor 16 that executes instructions, RAM 18 that stores instructions and a chipset 20 that coordinates physical interfaces between the processing components. Chipset 20 includes firmware instructions stored in flash memory that perform management functions, such as booting an operating system to execute on processor 16, managing power consumption by the processing components and maintaining a predetermined thermal environment within chassis 14. For instance, a cooling module 22 executing on chipset 20 performs closed loop temperature control by reading temperatures from sensors disposed in chassis 14 and adjusting the speed at which a cooling fan 24 operates in order to maintain a desired temperature range. Generally, cooling fan 24 operates at a fast enough speed to maintain an airflow that keeps the temperature below a predetermined level, but no faster than necessary so that the cooling fan does not consume excessive power or make excessive noise. If cooling fan 24 cannot maintain thermal conditions within desired constraints when running at full speed, then cooling module 22 throttles or powers down the operation of processing components to reduce heat produced by the processing components.

During normal operations, processing components within information handling system 10 communicate information with non-volatile storage device 12 through a data link supported by chipset 20, such as a SATA standard link 26 and a SATA interface 28 accessible at the exterior of the chassis 30 of non-volatile storage device 12. In alternative embodiments, alternative communication protocols might be used, such as SAS, Fibre Channel, USB and PCIe protocols. A controller 32 manages access to a non-volatile storage media 34, such as a magnetic media found in hard disk drives or flash memory found in solid state drives, to read and write information. A cache 36, such as a dynamic random access memory (DRAM), provides temporary storage of read and write information for controller 32 during read and write operations. Controller 32 accesses storage media 34 based upon logical block addresses (LBA) that identify where information is stored, such as the LBA range defined by the SATA standard, which defines 48 address bits for the SATA protocol for a greatest storage device capacity of more than 144,000 TB of information. In addition to performing accesses to storage media 34, controller 32 tracks drive information 38 regarding the operations of storage device 12, such as a log page or a diagnostics page with information describing drive operations. For example, a temperature sensor 40 senses temperatures at the chassis 30 of storage device 12 and stores the sensed temperatures as drive information 38. Drive information 38 may be stored in a variety of areas of non-volatile storage device 12, such as reserved area of storage media 34 that is not accessible for normal operation reads and writes or reserved area within cache 36. Controller 32 provides access to drive information 38 with defined commands that interrupt or override normal read and write accesses.

In order to provide more accurate closed loop control within chassis 14 of information handling system 10, cooling module 22 accesses storage device temperatures sensed by temperature sensor 40 and stored in drive information 38 and applies the storage device temperatures to set the speed of cooling fan 24. Cooling module 22 accesses the temperatures and other management information from drive information 38 by issuing a read for a small range of logical block addresses dedicated to returning information about the current or historical status of storage device 12, such as temperature, SMART data, sense data, internal timer values, mode page settings, log pages, diagnostics pages or other management information. Issuing a read command to a logical block address allows a read of management information as a pseudo I/O operation that is queued with normal I/O commands instead of a special command that interrupts normal I/O operations.

To perform a pseudo I/O operation, a normally unused range of logical block addresses is set aside for reading management information, such as the very high end of the SATA standard range FFFF_FFFF_FF00h to FFFF_FFFF_FFF7h, which provides 248 pages of 512 bytes each for drive information in an address range that is well out of the way of a currently envisioned drive capacity. This allows a request to non-volatile storage device 12 for management information to queue with other I/O operations so that normal I/O operations are not interrupted. Drive information logic 42, such as firmware executing on controller 32, recognizes logical block addresses in the management information range and references a drive information mapping table 44 to map the read operation for the management information logical block address to the drive information area 38 that includes the temperatures. For example, drive information mapping table 44 maps a management information logical block address to the physical location in the reserved area of storage media 34 or cache 36 that stores drive information 38 so that drive information 38 is read as a normal I/O operation at SATA interface 28 instead of with a special controller command. By sending read commands to appropriate logical block addresses, cooling module 22 or other firmware or software applications, can read any drive information 38 as a normal I/O operation that does not interfere with storage device performance, such as a read of a log page, diagnostics page, temperature log or other management information. Using the management information logical block addresses to poll temperature information from storage device 12 allows a short polling interval of as often as every few seconds without forced aborting of I/O commands in the queue of storage device 12 to provide information for closed loop control without impacting drive performance. In addition to reading information, writes to drive information 38 may also be performed as pseudo I/O operations.

Figure 2:
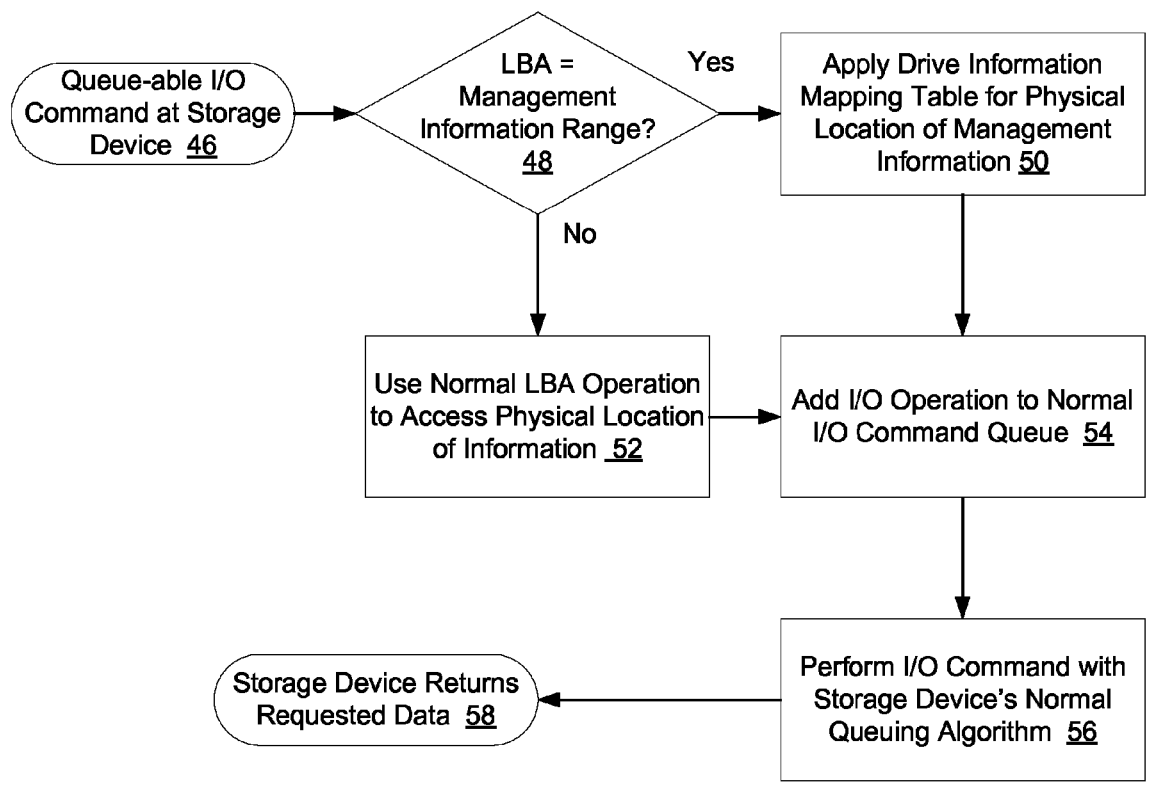
FIG. 2 depicts a flow diagram of a process for reading drive information from a storage device in response to a logical block address.

Referring now to FIG. 2, a flow diagram depicts a process for reading drive information from a storage device in response to a logical block address. The process begins at step 46 when a queue-able I/O command arrives at storage device. At step 48 a determination is made of whether the command has a logical block address that falls within the range defined for access to management information of the storage device. If the logical block address falls within the management information range, the process continues to step 50 to reference the drive information mapping table to determine the physical location of the drive information associated with the logical block address. If at step 48 the logical block address does not fall within the management information logical block address range, the process continues to step 52 to use the storage device's normal logical block address physical location and storage media mapping process to access the information. At step 54, the operation to access the information is added to the storage device's normal I/O command queue, whether the operation is a normal read or a read of drive information. At step 56, the storage device's normal queuing algorithm determines the optimal command processing sequence and returns the requested data to the host that sent the I/O command. Requests for management information mapped to DRAM or other non-media locations may be processed in parallel with requests for data or drive information located on the storage media of the storage device. At step 58, the storage device returns the requested data and a completion status to the host device.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis;
   a processor disposed in the chassis and operable to process instructions;
   memory disposed in the chassis and interfaced with the processor, the memory operable to store the instructions;
   a cooling fan operable to provide a cooling airflow in the chassis;
   firmware operable to manage the cooling fan operation to maintain predetermined thermal conditions; and
   a non-volatile storage device that stores information with logical block addresses, the stored information accessible by the processor by a logical block address read command sent through a data link, the non-volatile storage device having a temperature sensor to measure a temperature at the non-volatile storage device, the temperature sensor storing the temperature in a diagnostics log accessible by an interrupt at the data link, non-volatile storage device operable to store the temperature to be accessible by the firmware through a read command of the firmware to a logical block address without the interrupt at the data link.

2. The information handling system of claim 1 wherein the non-volatile storage device comprises:
   a drive information mapping table that maps the temperature from a drive information storage area to the logical block address; and
   drive information logic interfaced with the drive information mapping table and operable to respond to read commands to the logical block address by retrieving the temperature from the drive information storage area.

3. The information handling system of claim 2 wherein the drive information storage area comprises a predetermined area of a storage media of the storage device that stores information for access by the processor.

4. The information handling system of claim 2 wherein the drive information storage area comprises random access memory integrated with the storage device.

5. The information handling system of claim 4 wherein the random access memory comprises a cache to aid reads and writes to a storage media of the storage device.

6. The information handling system of claim 1 wherein the storage device comprises a hard disk drive having a magnetic storage media.

7. The information handling system of claim 1 wherein the storage device comprises a solid state drive having flash memory storage media.

8. The information handling system of claim 1 further comprising a cooling module disposed in the firmware and operable to retrieve the temperature from the non-volatile storage device and apply the temperature to determine a fan speed.

9. The information handling system of claim 8 comprising plural non-volatile storage devices, wherein the cooling module retrieves the temperature from each of the plural non-volatile storage devices and applies the retrieved temperatures to determine a fan speed.

10. A method for retrieving management information from a storage device, the method comprising:
    reading and writing information at the storage device through a data link that queues read and write requests associated with logical block addresses;
    storing the management information in a drive information area of a storage media of the storage device, the management information including at least a temperature measured at the storage device, the drive information area accessible through the data link by an interrupt that aborts the queued read and write requests;

mapping the management information stored in the drive information area to a logical block address;

requesting retrieval of the management information with a read of the mapped logical block address from the storage device, the read of the mapped logical block address managed by the queue of read and write requests instead the interrupt; and in response to the requesting, retrieving the management information by reference to the mapping to access the management information from the drive information area.

11. The method of claim 10 wherein the storage device comprises a hard disk drive having a magnetic media and the management information comprises a log page of the hard disk drive stored on the magnetic media.

12. The method of claim 10 wherein the storage device comprises a hard disk drive having a magnetic media and the management information comprises a diagnostics page stored on the magnetic media.

13. The method of claim 10 wherein the drive information area comprises a predetermined portion of a random access memory cache of the storage device.

14. The method of claim 10 further comprising:
communicating the management information through a link to firmware of an information handling system; and
applying the management information with the firmware to control a thermal environment of the information handling system.

15. The method of claim 14 wherein the management information comprises a temperature measured at the storage device and the firmware controls a thermal environment by controlling a cooling fan speed.

16. A storage device comprising:
a chassis;
a non-volatile storage media disposed in the chassis and operable to store information;
an external interface operable to communicate the information with devices external to the storage device;
a temperature sensor disposed at the chassis and operable to measure a temperature at the storage device and to store the temperature in a drive information area of the storage device, the drive information area accessible through the external interface with an interrupt;
a controller disposed in the chassis and interfaced with the non-volatile storage media, the external interface and the drive information area, the controller operable to respond to requests for information stored at logical addresses of the non-volatile storage media using a queue of read commands to logical block addresses by retrieving the information and communicating the information through the external interface, the queue of read commands being aborted in the event of an interrupt to access the drive information area; and
drive information logic executing on the controller and operable to respond to a request for information, the request made at a temperature logical block address, by retrieving the temperature information from the drive information area through the queue of read commands to logical block addresses without an interrupt.

17. The storage device of claim 16 wherein the drive information area comprises a predetermined portion of the non-volatile storage media.

18. The storage device of claim 16 further comprising a cache interfaced with the controller and operable to cache information for writing and reading to the storage media, wherein the drive information area comprises a predetermined portion of the cache.

19. The storage device of claim 16 wherein the external interface comprises a SATA interface.

* * * * *